INVENTOR.
Donald L. Stivender
BY
Robert J. Outland
ATTORNEY

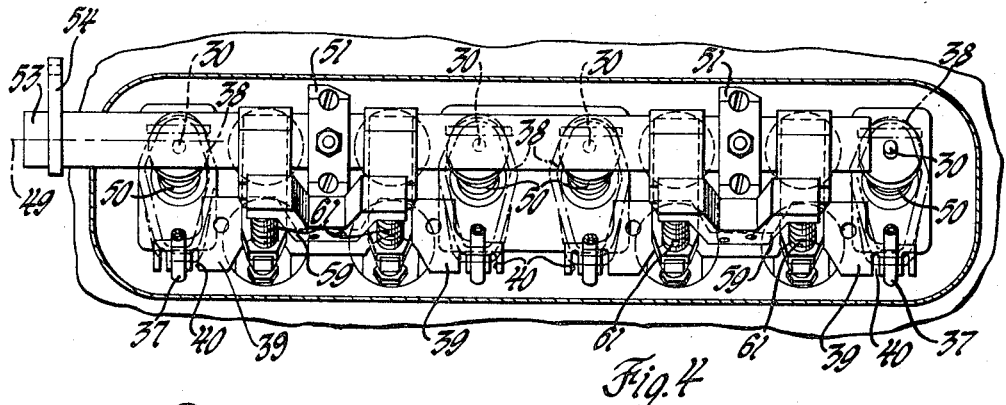
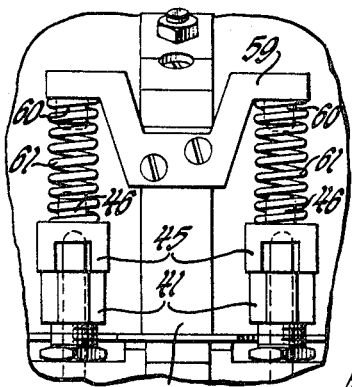
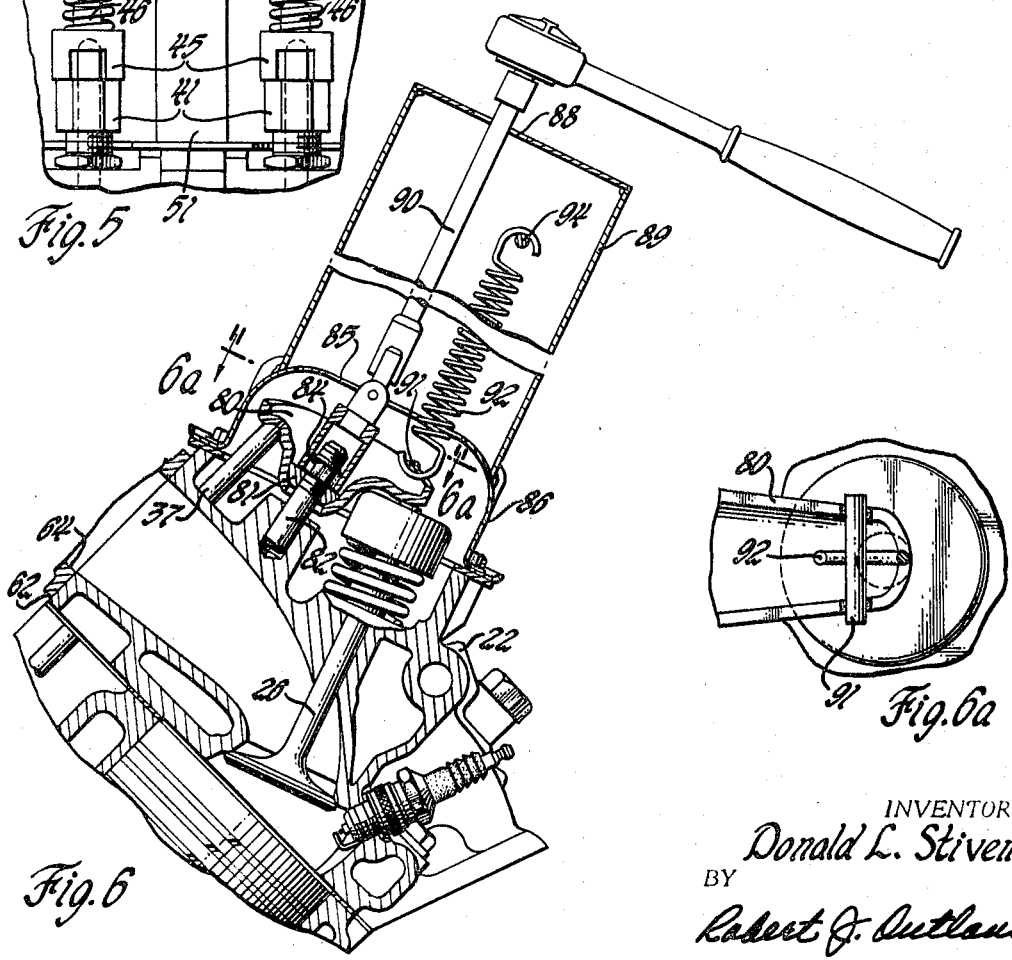
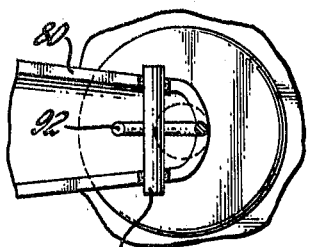

Jan. 21, 1969     D. L. STIVENDER     3,422,803
INTERNAL COMBUSTION ENGINE CONSTRUCTION AND METHOD
FOR OPERATION WITH LEAN AIR-FUEL MIXTURES
Filed June 7, 1967     Sheet 4 of 4
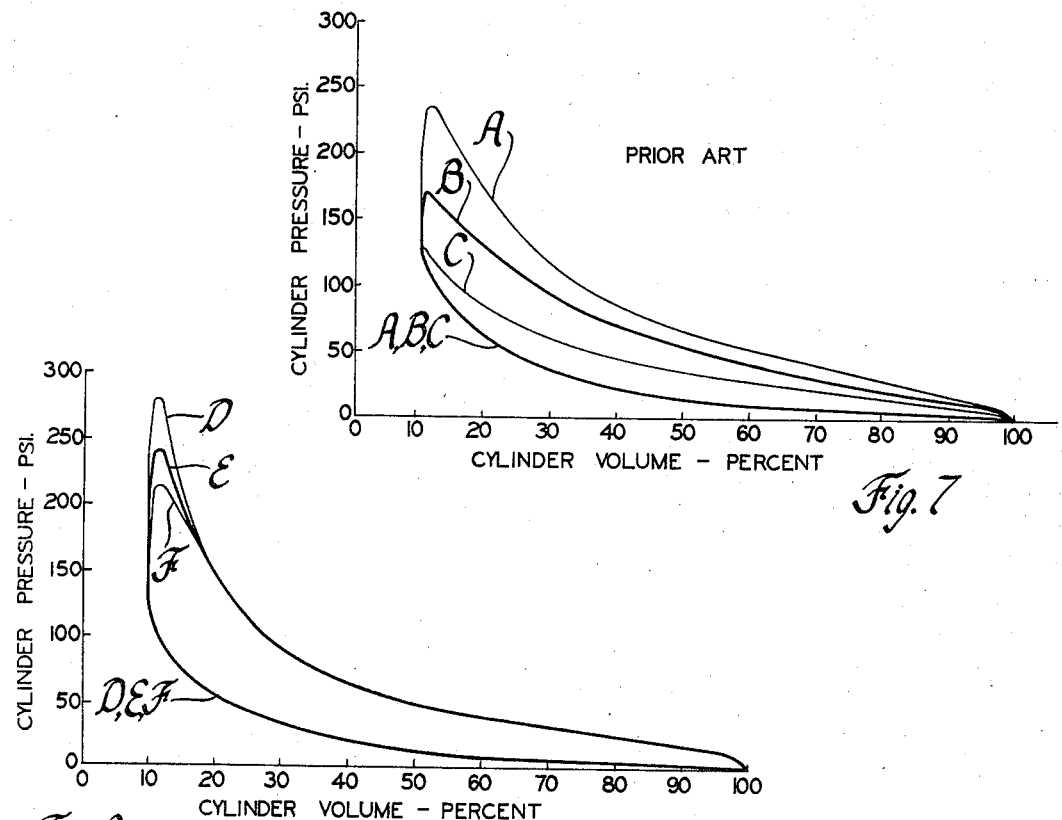
Fig. 7
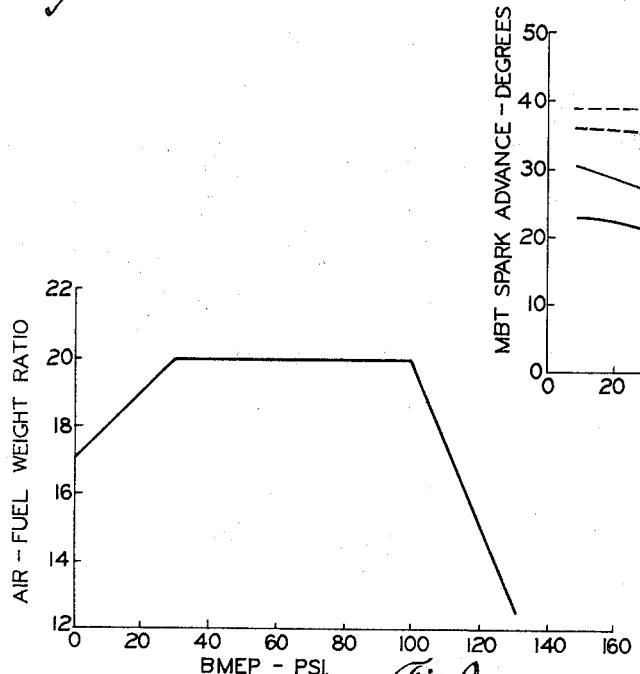
Fig. 8
Fig. 9
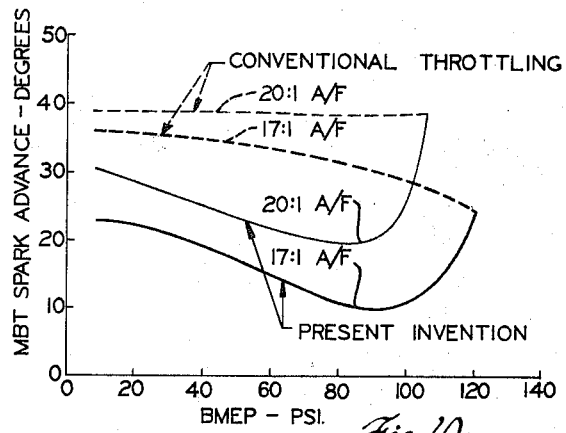
Fig. 10
INVENTOR.
Donald L. Stivender
BY
Robert J. Outland
ATTORNEY United States Patent Office 3,422,803
Patented Jan. 21, 1969

3,422,803
INTERNAL COMBUSTION ENGINE CONSTRUCTION AND METHOD FOR OPERATION WITH LEAN AIR-FUEL MIXTURES
Donald L. Stivender, Warren, Mich., assignor to General Motors Corporation, Detroit, Mich., a corporation of Delaware
Filed June 7, 1967, Ser. No. 644,369
U.S. Cl. 123—90                                7 Claims
Int. Cl. F02b 1/06; F01l 1/18

ABSTRACT OF THE DISCLOSURE

A spark ignition internal combustion engine construction and method of operation to provide smooth operation at lean mixtures. The method involves the creation of small scale, high intensity turbulence in the cylinder charge by throttle action achieved by varying the range of inlet valve opening movement and restricting mixture flow to the cylinder with operation at air-fuel weight ratios of at least 18 to 1 over substantial portions of the engine power range. The apparatus enables variation of inlet valve lifts down to very small values through the use of a movable pivot rocker lever.

---

This invention relates to internal combustion engines and more particularly to the construction and method of operation of an internal combustion engine adapted for smooth operation at lean mixtures.

In the spark ignition or gasoline type internal combustion engine, an air-fuel mixture is drawn into each cylinder, compressed, and ignited. Satisfactory engine operation requires nearly complete combustion of the mixture when so ignited, thereby heating the contents of the cylinder and giving rise to the pressures that provide output energy on the power stroke.

Conventional gasoline engine constructions have been generally limited in their ability to be operated at lean mixture ratios to air-fuel ratios of no greater than about 17:1, or only slightly greater than the stoichiometric air-fuel ratio of approximately 15:1. Attempts to operate engines at higher air-fuel ratios in any portions of the operating range have resulted in excessive cycle-to-cycle variations in combustion rates and resultant engine torque which creates noticeable engine surge and adversely affects drivability of the vehicle. This problem is especially pronounced at idle, low speeds and light loads, and has required the use of richer mixtures and more fuel than efficient power output requires in order to provide tolerable engine operation.

I have discovered that the development of high intensity, small scale turbulence in the charge delivered to the engine cylinders will permit engine operation at air-fuel ratios up to as high as 23:1 under certain engine conditions and at 20:1 over a broad range of engine loads and speeds without excessive surge or adverse effect to drivability. Such operation has been obtained with more constant cycle-to-cycle repetition of combustion characteristics than is found in conventional engine operation. This effect results from a rapid increase in the rate of combustion which occurs when the high intensity, small scale turbulent conditions are created.

A high intensity, small scale turbulence is imparted to the cylinder charge as it enters the cylinder by utilizing the inlet valve to throttle the fuel-air charge entering the engine cylinder. The usual carburetor air throttle arrangement is either eliminated or used only to a limited extent. The very small valve lifts thus used for throttling cause the charge to enter the cylinder through an annular orifice having a very small width dimension. Substantial pressures are developed across the valve by the suction of the piston on its intake stroke. These usually exceed the critical pressure and, in any event, create small scale, high intensity turbulence in the mixture entering the cylinder. This condition at the time of intake has a prolonged effect so that, upon ignition, there is a substantial increase in combustion rates with the resulting uniform combustion characteristics previously noted. This is true even at idle speeds.

Further advantages of the invention will be apparent from the following description of certain embodiments selected for purposes of illustration and wherein:

FIGURE 4 is a cross-sectional view taken generally along the planes indicated by line 4—4 of FIGURE 2 and showing a generally top plan view of the engine valve gear;

FIGURE 5 is a fragmentary cross-sectional view taken generally in the plane indicated by the line 5—5 of FIGURE 2 and showing the rocker arm return springs and associated mechanism of a pair of adjacent intake valves in generally side elevation;

FIGURE 6 is a fragmentary cross-sectional view of an alternative embodiment of an engine capable of operating in accordance with the process of the present invention;

FIGURE 6a is a fragmentary cross-sectional view taken generally in the plane indicated by line 6a—6a of FIGURE 6;

FIGURES 7 and 8 are graphical presentations illustrating comparative pressure-volume diagrams of a conventional engine and of an engine according to the invention, respectively, while operating at air-fuel weight ratios of approximately 20:1;

FIGURE 9 is a diagram showing an operational curve of air-fuel ratio vs. brake mean effective pressure for an exemplary engine operating according to the invention; and FIGURE 10 is a diagram showing comparative values of minimum spark advance for best torque vs. brake mean effective pressure at two air-fuel ratios for both conventional operation and operation according to the present invention.

Figure 1:
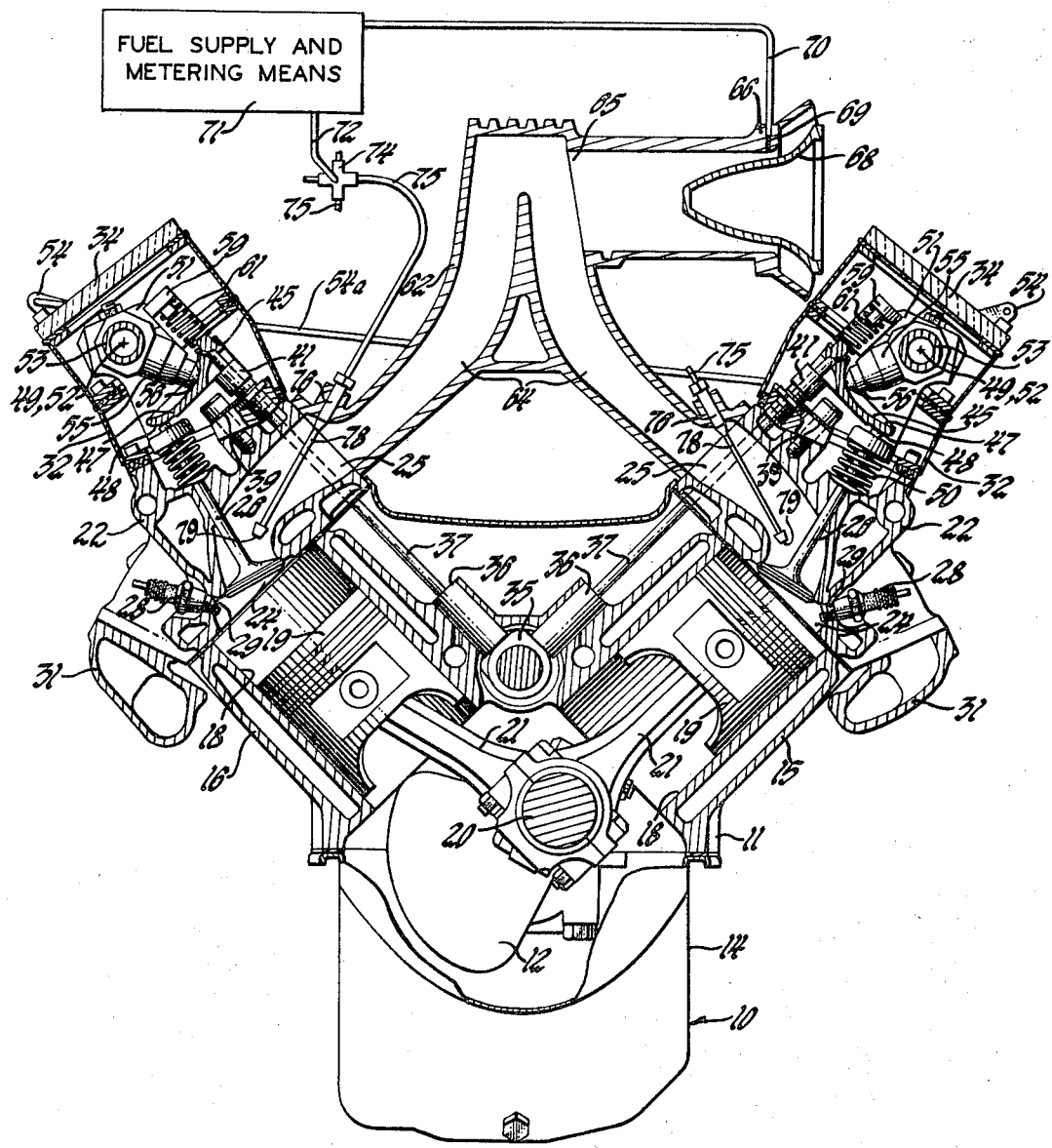
FIGURE 1 is a cross-sectional view of an internal combustion engine incorporating the preferred form of the apparatus of the invention and suitable for operation in accordance with the invention.

Referring now to FIGURES 1–5 of the drawings in more detail, numeral 10 generally indicates an internal combustion engine including a cylinder block 11 rotatably journaling a crankshaft 12 and carrying an oil pan 14 closing the lower portion of the block and enclosing the crankshaft supporting portions. Cylinder block 11 includes a pair of angularly extending cylinder banks 15, 16 each having a plurality of longitudinally aligned cylinders 18 in each of which is reciprocably disposed a piston 19 connected with a crank throw 20 of the crankshaft by connecting rods 21. These elements operate in a conventional manner to convert reciprocating action of the pistons into rotating motion of the crankshaft.

Mounted on the cylinder block 11 and closing the upper ends of the cylinders of each bank in a conventional manner are cylinder heads 22. The cylinder heads cooperate with the cylinders to define combustion chambers 24 and include the inlet passages 25 closed by inlet poppet valves 26 to provide for the admission of combustible mixtures to the combustion chambers. Also provided in the cylinder heads are spark ignition devices, such as spark plugs 28 extending through openings 29 into the combustion chambers 24, and exhaust passages (not shown) closed by the usual exhaust valves 30 (see FIGURE 4) and connecting with conventional exhaust manifolds 31 to provide for the removal of exhaust products from the cylinders.

The upper portions of the heads are closed by valve covers 32 which form enclosures for the valve actuating mechanisms to be subsequently described and may include transparent cover portions 34 to permit viewing the operation of the valve mechanisms.

The actuating mechanism for the exhaust valves is conventional and includes a camshaft 35 driven from the crankshaft and centrally carried in the cylinder block intermediate the cylinder banks. The camshaft actuates conventional hydraulic lifters 36 which are reciprocably carried in the block 11 and in turn engage conventional push rods 37 which act upon cylinder head carried rocker arms 38. The rocker arms in turn engage the stems of exhaust valves 30 to open and close the valves in a conventional manner. Push rod guide means comprise metal plates 39 secured to the cylinder heads and having slotted portions 40 which engage the sides of the push rods so as to prevent their movement longitudinally of the engine and thereby restrain rotation of the exhaust rocker arms on their supports (not shown).

A special valve actuating mechanism which constitutes one of the features of the instant invention is provided for the inlet valves. This mechanism includes the conventional camshaft 35 used for actuating the exhaust valves as it includes a separate cam lobe for each inlet valve of the engine. These cam lobes actuate conventional hydraulic lifters 36 and push rods 37 as do the exhaust cam lobes of the camshaft. The inlet valve push rods extend through special guide and stop members 41 which are threadably received in the cylinder heads and limit movement of the push rods to limited reciprocating action. The upper ends of the push rods terminate in spherical heads 42 (FIGURES 2 and 3) which are received in complementary sockets 44 of specially shaped floating rocker levers 45. The rocker levers each include a spring retaining post 46 opposite from recess 44, a concave substantially arcuate or cylindrical surface 47 beginning adjacent the post 46 and extending to the opposite end 46a (FIGURE 2) of the rocker lever and a convex valve-stem receiving surface 48 opposite surface 47. Surface 48 is on the same side of the rocker lever as recess 44 but is at the end opposite from recess 44. Arcuate surfaces 47 are centered on axes 49. Surface 48 receives the stem 26a of the respective inlet valve 26 to actuate it in an opening direction as will be subsequently described. Conventional coil springs 50 are provided to close the inlet and exhaust valves.

The inlet valve gear further includes a pair of support members 51 mounted on each cylinder head and journaling, for rotatable adjustment around axes 52, control shafts 53. The latter extend longitudinally of the heads to positions adjacent each rocker lever 45 and beyond one end of covers 32 where they are connected with suitable operating means, such as levers 54, which are interconnected to operate in unison by a cross-shaft 54a. For reasons subsequently noted, the axes 52 of shafts 53 are arranged to be substantially coincident with axes 49 of the rocker arm lever surfaces 47 when the rocker arm levers are in their valve closed positions.

Figures 2, 3:
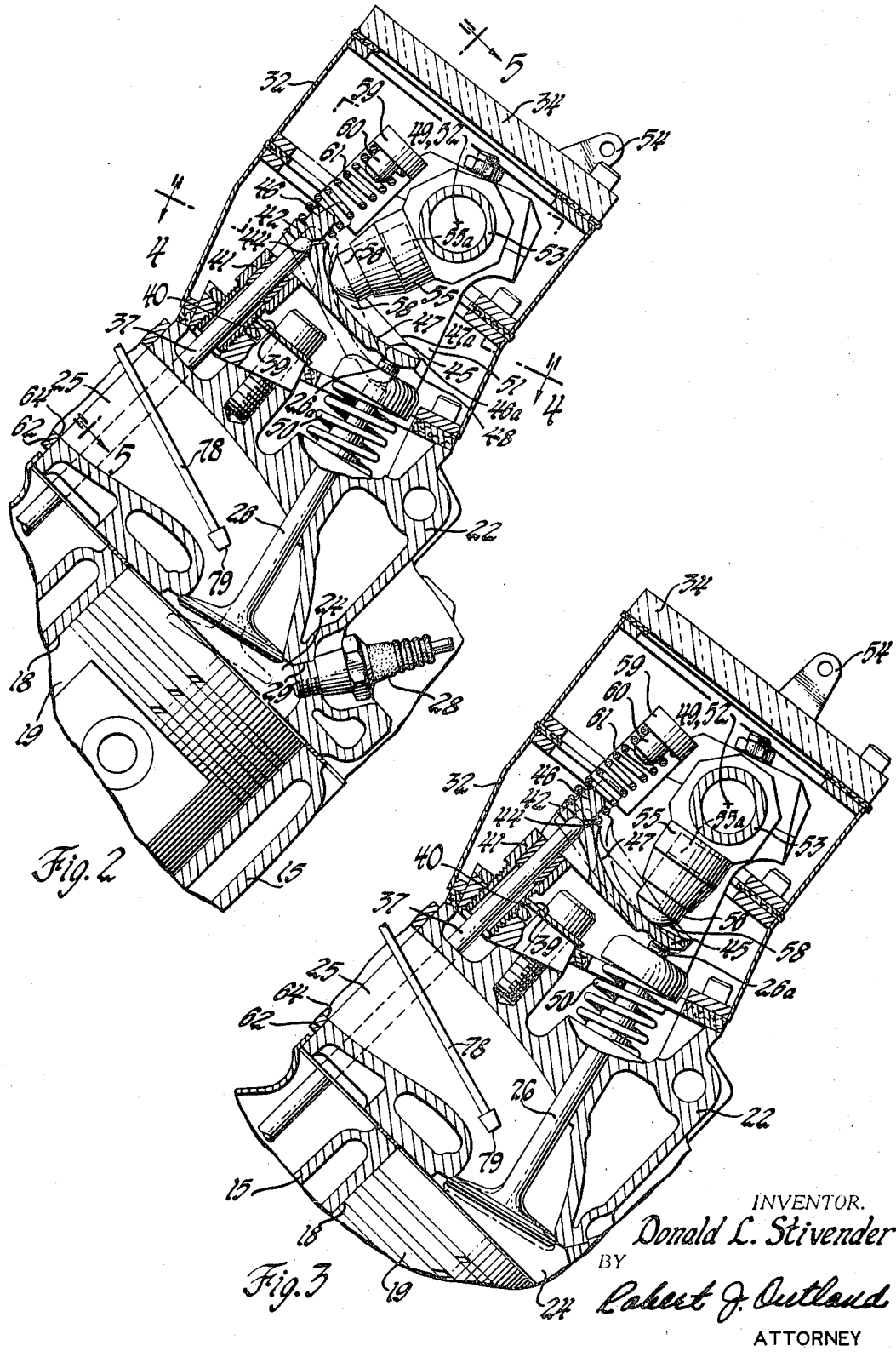
FIGURE 2 is a fragmentary view of the engine of FIGURE 1 showing an enlarged view of the valve actuating mechanism in the position for a relatively large valve opening movement.
FIGURE 3 is a view similar to FIGURE 2 showing the valve actuating mechanism in an operating position for relatively small valve opening movement.

Fixed on the shafts 53 adjacent each inlet rocker lever 45 is a control arm and hydraulic lash adjuster retainer 55 which receives a lash adjuster 56. Lash adjuster 56 is comprised of a cylinder-piston arrangement within which space 55a, FIGURE 3, is filled with oil to take up lost motion in the system as hereinafter described. Lash adjuster 56 terminates in a rounded pivot surface 58 which engages surface 47 of its respective rocker lever to act as a fulcrum or pivot for the rocker arm lever in a manner to be subsequently described.

Each support 51 also retains a spring retaining member 59 which includes a pair of spring retaining posts 60 located opposite posts 46 of an adjacent pair of rocker levers 45 and coacting therewith to retain coil springs 61 compressed therebetween for a subsequently described purpose.

The head 42 of the push rod 37, and the control arm 55–56 serves to locate each of the rocker arm levers 45 so as to maintain the engagement of the rocker arm with the inlet valve stem 26a. This locating action is achieved by reason of the head and socket 42–44 which are held in seated position by the spring 61 and by the side webs 47a, FIGURE 2, straddling the cylindrical surface 47 of the rocker arm lever 45. The latter are sufficiently close together to prevent significant wobble of the rocker arm lever about the axis defined by push rod 37, thus assuring at all times that the rocker arm lever 45 is positioned to engage the stem 26a of the inlet valve 26. Alternatively, a ball and socket conformation (or other locating conformation) may be provided between the stem 26a of the inlet valve and the end 48 of the rocker arm lever, and the rocker arm lever 45 thereby located by push rod 37 and the valve stem 26a without relying upon the adjustable fulcrum 55–56 or push rod guide 41.

*Inlet valve gear operation*

In operation, the inlet valve gear of the engine provides for a periodic opening and closing motion of each inlet valve occurring at a predetermined point and occupying a predetermined portion of the engine cycle as fixed by the shape of the inlet cam lobe on camshaft 35. In the above-described mechanism, the lift of the valves at each point in the cam lift cycle is controllable to permit any opening movement from the maximum provided for by the valve gear down to a zero lift position wherein the inlet valves do not open at all. During each opening and closing motion each inlet valve moves, through a range of opening positions, the valve being controllable at any range between and including zero opening and a predetermined maximum, at which the opening values at all points of the opening curve are maximized.

Inlet valve actuation is accomplished through rotation of camshaft 35, each inlet cam of which periodically reciprocates a hydraulic lifter 36 and in turn the respective push rod 37. The push rod in turn lifts the end 46 of rocker lever 45 against the bias of spring 61 causing the lever to pivot in the clockwise direction of FIGURES 2 and 3 around the pivot surface 58 of lash adjuster 56 so as to move valve engaging surface 48 downwardly and depress the associated inlet valve 26 to open the same. When the cam lobe passes lifter 36, valve spring 50 closes the valve and return spring 61 pushes rocker lever 45 against stop member 41 and holds it there for a dwell period until the next valve opening cycle. During this dwell period all valve lash in the system is taken up by the filling of space 55a of the hydraulic lash adjuster 56 and the lifter 36 with oil from the engine oil system so that lost motion in the valve actuating mechanism is taken up. This action is accomplished through one-way filling valves (not shown) in a conventional manner.

FIGURE 2 shows the mechanism of the right bank valve gear in the position in which maximum valve lift is obtained. Shaft 53 has been rotated by lever 54 to its extreme clockwise position moving the contact point of pivot surface 58 with rocker lever surface 47 to its closest permitted distance from push rod 37. In this position, actuation of the mechanism by the cam lobe moves the valve to its furthest open position as shown in phantom lines indicating the open positions of the valve, rocker arm and push rod.

FIGURE 3 shows the mechanism in a position in which very little valve lift is obtained when the mechanism is actuated. Shaft 53 has been rotated counterclockwise to a position not far from its furthest clockwise movement so that pivot surface 58 engages rocker lever surface 47 at a point intermediate valve 26 and push rod 37 but very close to the former. Thus, when the push rod moves upwardly through the same distance as before, the change in the rocker lever ratio caused by the movement of the pivot surface 58 causes a very slight opening motion of the valve to occur. If shaft 53 is moved further counterclockwise to its extreme position, surface 58 of the lash adjuster engages the rocker arm surface 47 above the end of valve 26 so that movement of the push rod creates no opening force on the valve and the valve remains closed. Thus, varying the position of lever 54 from one extreme to the other varies the periodic opening movements of the inlet valves in unison from zero to the maximum opening permitted by the mechanism. Since, however, the rocker lever surfaces 47 and the control shafts 53 have coincident axes 49, 52 in the valve closed positions, rotation of the control shafts to move the pivot point does not affect the closed position of the valves or the condition of zero lost motion but only changes the extent of inlet valve opening movement.

The use of lash adjusting means, such as hydraulic adjusters 36 and 56, to eliminate lost motion in the valve actuating mechanism is very important in the construction since the valve lift required to operate the engine at idle may be actually less than the valve lash (or lost motion) which would otherwise be necessarily provided in the valve train to allow for dimensional changes at varying temperatures. This is especially true in a multi-cylinder engine where the valve trains of the various cylinders tend to vary in dimension nonuniformly and to an extent that would cause severe unbalance in low end power output between the cylinders. Such unbalance would result in unsatisfactory rough engine operation. However, various modifications of the lash adjusting arrangement herein disclosed could be made. For example, valve lifters 36 could be made solid (nonhydraulic) combined with provision for clearance between valve rocker arm levers 45 and stop members 41 such that all valve lash adjustment would be accomplished by lash adjusters 56 which form the pivot means mounted on the control shafts 53.

*Induction and charge forming system*

Positioned between the cylinder banks is a ram type induction manifold 62 which contains individual passages 64 connecting with passages 25 of the respective cylinders and fed by a common inlet passage 65 provided adjacent the upper end of the manifold. The passage 65 is formed by an inlet conduit 66 which retains a venturi member 68 for a purpose to be subsequently described. An opening 69 at the throat of the venturi connects through conduit 70 to suitable fuel supply and metering means 71. Means 71 is connected with a source of fuel and connects through conduit 72, connector 74 and individual feed lines 75 to nozzle fittings 76 carried in the manifold adjacent the end of each passage 64 and having tubular extensions 78 extending into cylinder head passages 25. Nozzles 78 terminate in orifices 79 located adjacent valves 26 and are adapted to deliver a stream of fuel directly on the stem of each intake valve 26.

The fuel supply and metering means 71 may be of any suitable construction which is adapted to utilize the pressure signal transmitted through orifice 69 and conduit 70 from the throat of venturi 68 so as to deliver a metered supply of fuel controlled as desired in proportion to the flow of air passing through venturi 68 into the inlet manifold 62 and to deliver the fuel equally to the various individual cylinder head inlet passages where it is sprayed to the incoming air stream.

In the disclosed construction, no throttling means is used for controlling the charge of air and fuel delivered to the cylinders except for the control of inlet valve lift. It is, however, within the broad concept of the invention to use in addition to the throttling action of the inlet valves a throttling means upstream of the inlet valve so long as a sufficient pressure drop across the inlet valves is provided to accomplish in substantial measure the objectives of the invention. Carburetor type fuel supply means can also be used rather than the fuel injection type system disclosed.

*Engine operation*

In operation, air is drawn at a rate controlled by the extent of inlet valve opening through venturi 68 and into the various passages of the intake manifold and cylinder head. The rate of air motion through the venturi causes a pressure signal to be transmitted through conduit 70 to the fuel supply and metering means 71 which then delivers fuel through the individual nozzles 79 to the cylinder head inlet passages immediately adjacent the inlet valves at a rate proportional to the air flow. The fuel flow rate may be controlled as desired in accordance with engine conditions or other criteria by suitable mechanism in the fuel supply and metering means.

During the intake stroke of each piston, its respective inlet valve is opened by the valve mechanism previously described, the amount or extent of opening (i.e., the maximum valve lift) being controlled by the operator or automatically through the valve actuating mechanism (including arm 54) in accordance with the desired power output of the engine. With this arrangement, pressure in the inlet manifold and cylinder head inlet passages remains very near atmospheric while the pressure in the various cylinders during their intake strokes is below atmospheric, the pressure reduction reached being dependent upon the valve opening. With the valve completely closed, cylinder pressures may drop below one-tenth of an atmosphere during the intake stroke. This value is well below the critical pressure, making the amount of charge entering the cylinder depend on the valve opening area. Thus, varying the opening of the intake valve acts as a means of varying the amount of fuel and air mixture which is delivered to each cylinder on its intake stroke.

At all but the maximum load condition (maximum valve opening) of the engine, the rate of mixture flow past the valve and valve seat and into the cylinder is accelerated over that of a conventional engine in which the valve opening remains constant under all load conditions. For a particular engine of the type described, it has been found that operation up to 75% of maximum load may be obtained at lower speeds with valve lifts less than one-quarter of the maximum provided for the engine. Significantly, the operation of a vehicle with this engine at constant road speeds of 30 to 50 miles per hour would require valve lifts in the neighborhood of one-eighth to one-quarter the maximum valve opening with very slow speed operation accomplished by valve lifts of approximately one-fiftieth the maximum opening.

The restriction in the valve opening is seen to be substantial under the majority of engine operating conditions and results in a high velocity mixture flow through the relatively narrow annular orifice provided by the valve opening into the engine cylinder. This creates high velocity turbulent eddys within the mixture which move in paths having relatively small dimensions as compared to the size of the cylinder. These eddys are herein called high intensity, small scale turbulence. This turbulence has effects that persist through the intake stroke and the compression stroke even at low speeds. Consequently, upon ignition of the charge, the rate and uniformity of combustion is substantially increased over that of conventionally throttled engines.

In all but the high range of engine loads (where valve throttling is not significantly different from conventional throttling) the minimum spark advance for best torque with the engine herein described is in the neighborhood of 10° to 20° retarded from that of a conventionally throttled engine.

This fact results from and is illustrative of the high rates of combustion obtained at part load operation with the present engine, rates which are significantly higher than those of conventional engines. For example, when an engine of this type was operated both as a conventional engine (as illustrated in FIGURE 7) and in accordance with the present invention (as illustrated in FIGURE 8), the operation being under similar conditions over a wide range of loads at a constant speed of 1200 r.p.m. and at air-fuel ratios of both 20:1 and 17:1, the minimum spark advance settings for best torque were determined to be approximately as indicated in FIGURE 10.

The surprising improvement in engine operation achieved with the present invention is shown graphically in FIGURES 7 and 8. In conventional engines large cycle-to-cycle variations in combustion rates occur with lean air-fuel mixtures. The engine operation of the present invention greatly reduces these variations.

Considerable effort has been expended up to the present time in the development of conventional engines to operate at lean air-fuel mixtures. This work has resulted in the design of engines which can be operated at air-fuel mass ratios in the neighborhood of 17 parts of air to one part of fuel, or slightly greater than the stoichiometric ratio of about 15:1. Attempts to operate engines beyond this limit leads to these excessive cycle-to-cycle variations in combustion rates which adversely affect engine operation and vehicle performance.

By reducing the cycle-to-cycle variations, the present invention makes effective engine operation possible at substantially higher air-fuel ratios than are possible in conventional engines. Satisfactory engine operation has been accomplished using my method at air-fuel mass ratios up to 23:1 under certain conditions and it is not difficult to obtain satisfactory operation over a broad load range of from approximately 15% to approximately 75% of the maximum engine load at air-fuel ratios of 20:1.

FIGURE 7 illustrates the random cyclic variations in a cylinder pressure volume diagram obtained when running an engine with conventional throttling and constant normal valve lift at medium speed and load with an air-fuel ratio near 20:1. The curves A, B and C represent high, medium and low output cycles actually occurring within the operating engine during a very brief interval of a small number of cycles. The differences in areas enclosed by these curves represent radical differences in work output in the respective cycles due to combustion variations. The condition of severe surge makes satisfactory operation under these conditions substantially impossible. For comparison, FIGURE 8 illustrates the cycle-to-cycle variations occurring in the same engine operated with valve throttling according to the present invention under substantially the same conditions as the engine in FIGURE 7. Curves D, E and F represent maximum, mean and minimum cyclic variations occurring in a similar brief interval of operation. The curves of FIGURE 8 are practically coincident throughout their lengths with differences occurring only in the peak pressures reached near the minimum volume position of the cylinder. These differences in peak pressure have a relatively small effect on the total area within the curves and thus represent a relatively small difference in work output between cycles. Smooth, effective engine operation well within the surge limit was obtained.

FIGURE 9 represents an exemplary air-fuel ratio vs. brake mean effective pressure (BMEP) curve for an engine operating in accordance with the present invention at 1200 r.p.m. Operation of the engine at 20:1 air-fuel ratio is shown for points between approximately 30 and 100 BMEP. While it is possible to operate at 20:1 air-fuel ratio below 30 BMEP and down to no load if desired, it has been found that a slight enrichment of the mixture at the low end of the load range to about 17:1 air-fuel ratio at no load has a beneficial effect on hydrocarbon emissions while maintaining low emissions of oxides of nitrogen and carbon monoxide. Above approximately 100 BMEP, enrichment of the mixture provides increased energy to the cylinders to obtain the maximum power output of the engine. This condition only occurs during a very small percentage of engine operation when rapid acceleration or high horsepower output of the engine is required.

When an engine according to the present invention was operated over its load range at a constant speed following the air-fuel ratio curve of FIGURE 9, it was found that nearly optimum operation was obtained with the spark timing fixed at a predetermined value. The reason for this is apparent from FIGURE 10 where it is seen that with the present invention the minimum spark advance for best torque is relatively constant at 20:1 air-fuel ratio over the middle load range and that it increases sharply at high loads and moderately at low loads. These increases may be offset, however, by decreasing the air-fuel ratio at the low and high load conditions which, as indicated by the 17:1 air-fuel ratio line of FIGURE 10, reduces the minimum spark advance setting for best torque.

Applying these discoveries over the engine speed range it is possible to obtain desirable engine performance with the spark timing controlled solely as a function of engine speed when air-fuel ratio is controlled as in FIGURE 9 to obtain the other desirable characteristics previously mentioned. This is in marked contrast to conventionally throttled engines which, in addition to the usual advance of spark timing with increasing engine speed, generally require spark timing to be separately advanced at part load operation as by a vacuum advance device, in order to obtain satisfactory performance.

Description of an alternative embodiment

FIGURES 6 and 6a illustrate an alternative embodiment of the present invention which resulted from the modification of a conventional engine to operate in accordance with certain concepts of my invention. The structure disclosed, in which like numerals are used for like parts corresponding to those of the first described embodiment, includes a conventional cylinder block, cylinder head and other components found in the preferred embodiment but differs in the structure of the inlet valve actuating mechanism. This mechanism comprises a conventional push rod 37 actuating a formed steel rocker arm 80 conventionally retained by a spherical washer 81 carried on a stud 82 retained in the cylinder head 22. Rocker arm 80 contacts and actuates the valve 26 in a conventional manner.

The construction differs from conventional in that an elastic stop nut 84 retains washer 81 on the stud and provision is made for adjustment of the stop nut position through the provision of an opening 85 in valve cover 86 and a similar opening 88 in an extension 89 welded to the valve cover so that a socket wrench assembly 90 may be inserted for this purpose. An additional modification is the securing of a rod 91 between the sides of rocker arm 80 to receive the hook portion of a coil spring 92, the other end of which is supported by a pin 94 secured to extension 89 so that spring 92 is under tension and holds rocker arm 80 at all times in engagement with push rod 37.

In this alternative embodiment a solid lifter replaces the hydraulic lash adjuster 36 shown in FIGURE 1 and usually used between the camshaft 35 and push rod 37. Accordingly, the adjustment of nut 84 with wrench assembly 90 determines the clearance between rocker arm 80 and the end of valve 26 which in turn determines the degree of valve opening that will be accomplished by the predetermined movement of push rod 37. If the clearance is made sufficiently great by moving nut 84 upwardly, the valve will not open at all. The operation of this embodiment differs from that of a preferred embodiment in that adjustment of the mechanism to reduce valve lift additionally reduces the time of valve opening since a reduced portion of the cam lift profile is utilized to open the valve. Nevertheless, operation of the engine with varying valve lifts accomplished along with changes in valve opening time produced, in actual tests, results substantially similar to those described for the preferred embodiment.

A number of advantages are provided by the present engine and method of engine operation, all stemming from the increased rate of combustion of the air-fuel mixture and substantial elimination of the cycle-to-cycle random variations in the combustion rate at lean air-fuel mixtures. During medium and low load operation, the air-fuel mixture is burned more completely and nearer the top center position of the piston resulting in a more efficient operating cycle, with consequent reduction in exhaust temperatures and fuel consumption. Reduced exhaust temperatures ease operating conditions of the engine exhaust system and muffler. Excess oxygen is present throughout the cycle and remains in the exhaust, minimizing emissions of carbon monoxide. Oxides of nitrogen in the exhaust gases are also minimized. The minimum spark advance for best torque of the engine is substantially retarded as compared to the timing of a conventional engine. Knock sensitivity of the engine is also reduced. If desired, additional spark timing retard may be provided. This has the effect of elevating exhaust temperatures, and takes advantage of the excess oxygen in the exhaust gases to further oxidize unburned hydrocarbons before discharge of the exhaust gases to atmosphere.

While the features of the instant invention have been explained by reference to certain specific embodiments, it should be apparent that numerous changes could be made without departing from the inventive concepts disclosed herein and, accordingly, I desire that my invention be limited only in accordance with the language of the following claims.

I claim:

1. The method of operating a spark ignition internal combustion engine utilizing liquid hydrocarbon fuel, said engine being of the type having a plurality of cylinders, pistons in the cylinders, respectively, and connecting rods connecting the pistons, respectively, to a common crankshaft, said engine having an inlet valve for each cylinder that is opened for a portion of each intake stroke of its respective piston to draw air-fuel mixture into each cylinder, said method being characterized by the step of varying in unison the extent of inlet valve openings between a predetermined maximum range for maximum engine power and a predetermined minimum range for minimum engine power, the valve opening variation constituting a principal control determining the amount of air drawn into each cylinder on the intake stroke, the inlet valve openings at least in the lower range of engine power being sufficiently small to cause substantial acceleration of the mixture entering each cylinder so as to create high intensity small scale turbulence within the cylinder, while simultaneously controlling the amount of fuel in the inlet air to maintain a weight ratio of air to fuel of at least 18 to 1 over a substantial portion of the range of engine power values.

2. The method of operating a spark ignition internal combustion engine utilizing liquid hydrocarbon fuel, said engine being of the type having a plurality of cylinders, pistons in the cylinders, respectively, and connecting rods connecting the pistons, respectively, to a common crankshaft, said engine having an inlet valve for each cylinder that is opened for a portion of each intake stroke of its respective piston to draw air-fuel mixture into each cylinder, said method being characterized by the step of varying in unison the extent of inlet valve openings between a predetermined maximum range for maximum engine power and a predetermined minimum range for minimum engine power, the valve opening variation constituting a principal control determining the amount of air drawn into each cylinder on the intake stroke, the inlet valve openings at least in the lower range of engine power being sufficiently small to cause substantial acceleration of the mixture entering each cylinder so as to create high intensity small scale turbulence within the cylinder, while simultaneously controlling the amount of fuel in the inlet air to maintain a weight ratio of air to fuel of at least 18 to 1 over one substantial portion of the range of engine power values and lesser ratios at another substantial higher portion of the range.

3. The method of operating a spark ignition internal combustion engine utilizing liquid hydrocarbon fuel, said engine being of the type having a plurality of cylinders, pistons in the cylinders, respectively, and connecting rods connecting the pistons, respectively, to a common crankshaft, said engine having an inlet valve for each cylinder that is opened for a portion of each intake stroke of its respective piston to draw air-fuel mixture into each cylinder, said method being characterized by the step of varying in unison the extent of inlet valve openings between a predetermined maximum range for maximum engine power and a predetermined minimum range for minimum engine power, the valve opening variation constituting a principal control determining the amount of air drawn into each cylinder on the intake stroke, the inlet valve openings at least in the lower range of engine power being sufficiently small to create high intensity small scale turbulence within the cylinder, while simultaneously controlling the amount of fuel in the inlet air to maintain a weight ratio of air to fuel of at least 18 to 1 over a substantial portion of the range of engine power values and lesser ratios at the lower and upper portions of the range.

4. The method of claim 3 and further characterized by the step of operating with the spark timing controlled solely as a function of engine speed, such that the spark timing setting at each speed is unaffected by variations in engine load.

5. A spark ignition internal combustion engine of the type comprising cylinder defining means having an intake opening, a piston reciprocably movable in the cylinder, a power output shaft, means operatively connecting said piston to the power output shaft, said piston and said cylinder means cooperating to define a combustion chamber in which a mixture of hydrocarbon fuel and air is burned periodically to develop power, and an inlet poppet valve having a stem and controlling said intake opening, said engine including the improvement of valve operating mechanism to open said valve during at least part of the piston intake stroke to draw air-fuel mixture into the combustion chamber, the valve operating mechanism being effective to open and close said valve and to selectively control the opening movement thereof between a predetermined maximum range and a predetermined minimum range, said mechanism including means biasing the valve to closed position, a rocker lever engaging the end of said valve stem for opening the valve against said biasing means, actuating means operatively engaging said rocker lever at a point spaced from said valve stem and adapted in operation to reciprocably move said point along a path of fixed length for each valve opening movement and pivot means operatively engaging said rocker lever to convert movement of said actuating means to reciprocating movement of said valve, said pivot means being movable along said rocker lever to selectively adjust the extent of opening movement of said valve, said pivot means including elements to shift the point of rocker lever pivot independent of movement along the rocker lever and operative during engine operation to take up clearance in said valve operating mechanism and eliminate lost motion between the actuating means and the valve whereby accurate control of very small opening movements of the valve is obtained.

6. A spark ignition internal combustion engine of the type comprising cylinder defining means having an intake opening, a piston reciprocably movable in the cylinder, a power output shaft, means operatively connecting said piston to the power output shaft, said piston and said cylinder means cooperating to define a combustion chamber in which a mixture of hydrocarbon fuel and air is burned periodically to develop power, and an inlet poppet valve having a stem and controlling said intake opening, said engine including the improvement of valve operating mechanism to open said valve for a portion of the engine cycle including at least part of the piston intake stroke to draw air-fuel mixture into the combustion chamber, the valve operating mechanism being effective to open and close said valve and to selectively control the opening movement thereof between a predetermined maximum range and a predetermined minimum range, said mechanism including means biasing the valve to closed position, a floating rocker lever having spaced push rod and valve stem engaging points on one side and a concave substantially arcuate surface on the opposite side generally between said points, said concave surface having a generating axis and the lever being positioned with the valve stem engaging point in engagement with the valve stem, a push rod engaging said rocker lever at the push rod engaging point, pivot means having an axis substantially coincident with said first-mentioned axis in the valve closed position of said rocker lever, said pivot means being rotatable about said pivot means axis and engaging the concave surface of said rocker lever, said pivot means providing a pivot for rocking action of said rocker lever for valve opening movements and being effective when rotated about said axis to vary the extent of said opening movements in relation to the extent of push rod travel, and means operatively connected with the push rod and adapted to reciprocate said push rod axially through a predetermined distance independent of the position of the pivot means, said rocker arm, valve stem, and push rod having interengaging conformations acting to locate the rocker arm in operative position.

7. The combination of claim 6 wherein said pivot means includes lash adjusting means operative during engine operation to take up clearance in said valve operating mechanism and thereby eliminate lost motion between the push rod means and the valve whereby accurate control of very small opening movements of the valve is obtained.

References Cited

UNITED STATES PATENTS

| 1,701,391 | 2/1929 | Short. |
| 2,014,659 | 9/1935 | Moorhouse. |
| 3,145,696 | 8/1964 | Baster. |
| 3,146,766 | 9/1964 | Fairchild _____ 74—522 XR |
| 3,157,166 | 11/1964 | MacNeill _____ 74—522 XR |
| 3,189,011 | 6/1965 | Briggs _____ 74—522 XR |

WENDELL E. BURNS, *Primary Examiner.*

U.S. Cl. X.R.

123—188; 74—522